Nov. 9, 1926.

H. F. TOWNER

POWER LIFT

Filed Nov. 22, 1923

Inventor
Heber F. Towner
By Lyon & Lyon
Attorneys

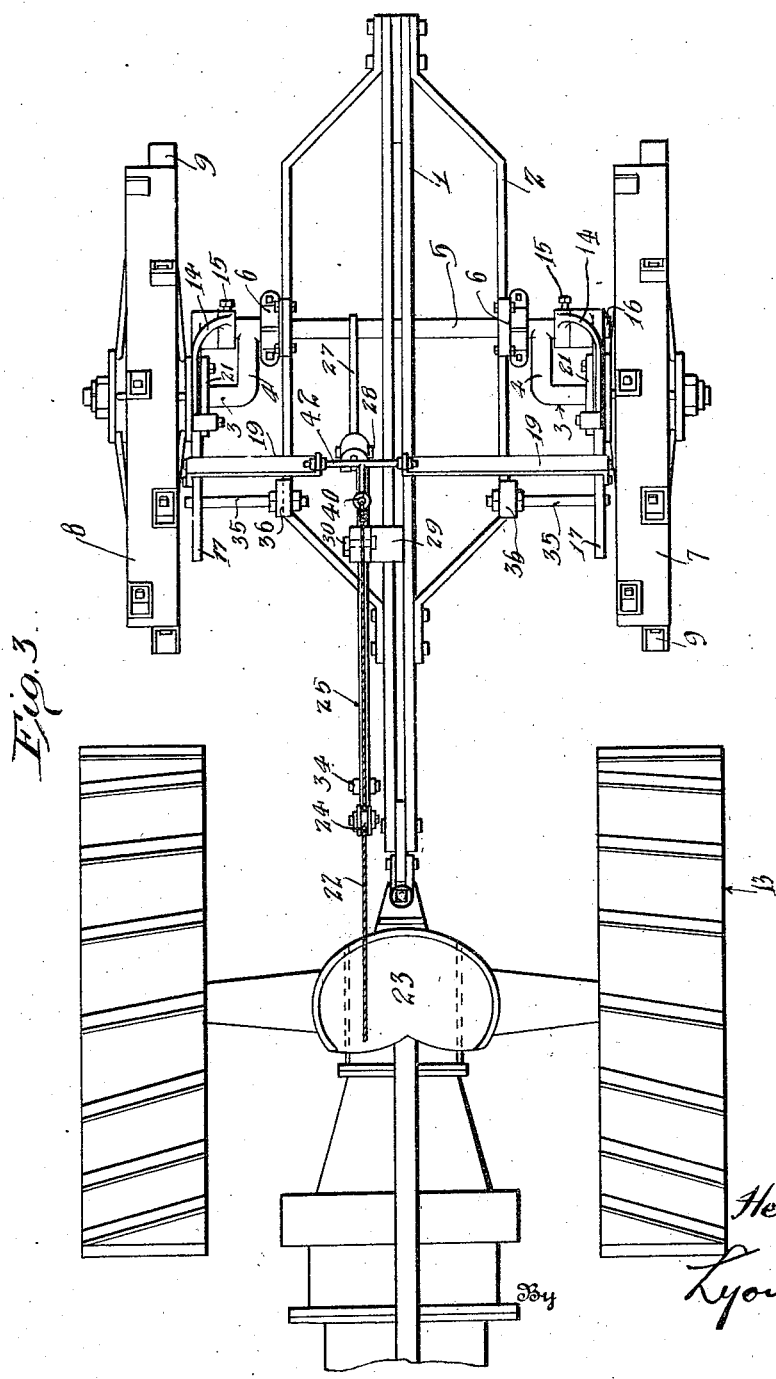

Patented Nov. 9, 1926.

1,606,195

UNITED STATES PATENT OFFICE.

HEBER F. TOWNER, OF SANTA ANA, CALIFORNIA.

POWER LIFT.

Application filed November 22, 1923. Serial No. 676,289.

This invention relates to improvements in power lifts for implements for ground working tools wherein the pull of normal draft is utilized to raise the tools from the ground.

In the operation of such plows the plowshare may encounter obstructions such as roots of trees or boulders lying in its path. In many cases these obstructions are sufficient to render it necessary to stop the tractor, and in such cases it becomes necessary to guide the plowshare around the obstruction or raise the same out of the ground. In the past when this raising has been accomplished either for the above named purpose, or because of a turn, or vegetation which it is not desired to plow up, the plowshare has been raised to an elevated position and held in said position and when it has been desired to lower the same into the ground again it has been necessary for the operator of the implement to stop the draft device, leave the seat thereof and to manually raise the plowshare a little and let the same fall. The plowshare is very heavy and this raising is only accomplished with great difficulty and hazard to the individual.

The general object of this invention is to produce an agricultural implement which will operate in such a way as to enable the operator to effect the lowering of the plowshare as easily as the raising has been accomplished in the past. More specifically, one of my objects is to provide a construction whereby the power of the draft of the implement may be utilized to effect this lowering of the plowshare to a predetermined position when the obstruction has been passed.

Further objects of the invention will appear in the detailed description of combination and novel parts, all of which contribute to produce an efficient agricultural implement.

A preferred embodiment of the invention is described in the specification and shown in accompanying drawing.

Figure 3 is a plan view thereof.

Figure 1:
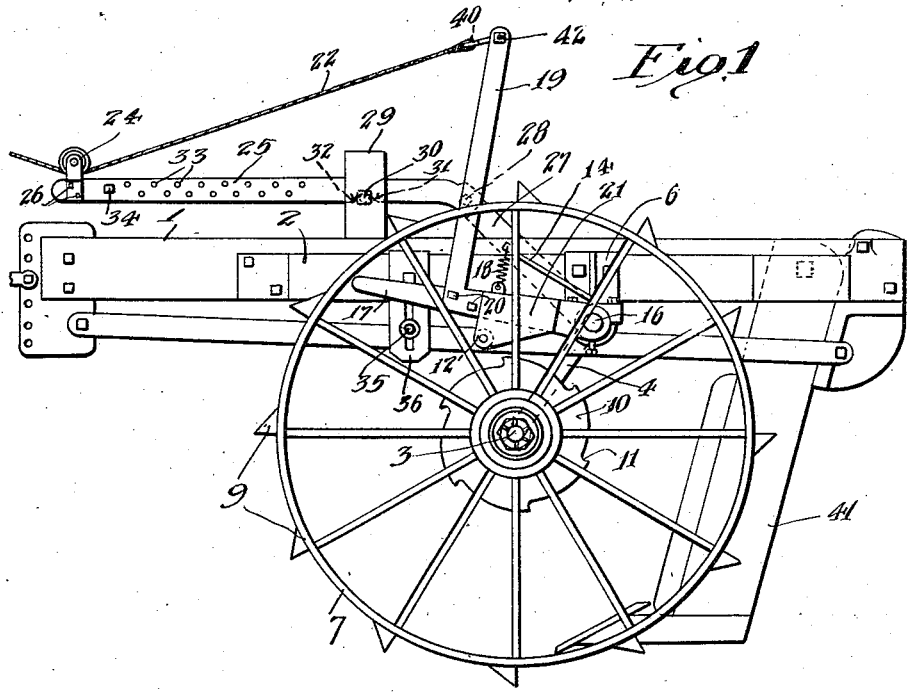
Figure 1 is a side elevation of a subsoil plow embodying this invention showing the plowshare in its elevated position.

In the drawings there are two medial frame members 1 and two outer frame members 2. The members 1 and 2 are secured together at their terminal ends and the medial portions of the members 2 are bowed transversely as shown in Fig. 3. Dependently supported on the rear end of the frame members 1 and 2 is shown a subsoil plow 41 although it is to be understood that any other form of ground working implement can be substituted therefor.

The crank axle 3 having crank arms 4 and medial crank portion 5 is journaled on the medial portions of the members 2 in suitable bearing 6. On the neck portions of the crank axle are journaled ground wheels 7 and 8, which are of any suitable construction. Bolted to the ground wheel are ground gripping members 9 which are preferably constructed on angle irons.

Rigidly connected to the ground wheel is a power wheel 10 having teeth or shoulders 11 which engage the pin 12 for raising the plowshare from the ground, using the pull or normal draft of the tractor 13 as will be hereinafter described. Rigidly secured to the crank shaft 3 in axial alignment with the crank pin 5, I provide a fixed arm 14 which is preferably adjustably secured by means of a set screw 15 to a stud portion 16 of the crank shaft, that aligns with the crank shaft and is an extension thereof.

A lifting link or arm 17 is pivotally mounted on the stud portion 16 and is normally held back by the spring 18 and secured to it and to the fixed arm 14 so that it is out of the path of the teeth 11. The arm 19 is rigidly secured to the arm 17 by the bolts 20 which arm 17 is provided with a bracket 21 carrying the pin or roller 12; a cord or cable 22 passes rearwardly from the driver's seat 23 on the tractor 13 through a pulley 24 which is securely bolted to an arm 25 as shown at 26. Arms 19 are connected by the link 42 to the eye bolt 40. By pulling the cord 22 the fixed lever 19 is pulled forward, the spring 18 is extended and permits the pin 12 to be projected into the path of the nearest approaching tooth 11 and if the tractor is operated to pull the implement forwardly, the rotation of the wheel 8 will exert a pull in the link 17 that will operate to rotate the crank shaft 5 on the axis of the arms 3 thereby raising the frame from the depressed position shown in Figure 2 to that position shown in Figure 1.

In order to hold the plowshare in either position shown the crank pin 5 is provided with an integral arm 27 the upper end of which is provided with the pivotal connection 28 which connects the arm 25 thereto. The arm 25 is guided in the bifurcated guide 29 which is rigidly secured to the inner frame members 1. The lower end of this arm 25 rides on a pin 30 extending through the side of the guide 29 and secured thereto. On the arm 25 there is positioned a detent 31, the forward edge of which forms a shoulder 32 which engages the pin 30 and holds the plowshare elevated as shown in Figure 1. I also provide means to hold the plowshare elevated in the position shown in Figure 3 which is preferably as follows: On the arm 25 are provided a plurality of bolt holes 33, any one of which may receive the bolt 34. The bolt 34 projects on both sides of the arm 25, and when the frame is depressed this bolt engages the forward edge of the bracket 29 and limits the descent of the frame.

When the wheel 10 is operated to lift the plow-frame, the lever 17 eventually comes into contact with a pin 35 which is mounted for vertical adjustment in a slotted bracket 36. When the lever strikes the pin it "cams" on the pin and pulls the pin 12 from engagement with the teeth 11. When this happens the shoulder 32 on the arm 25 engages the pin 30 and holds the plowshare elevated. The spring 18 then completely removes the teeth 11 from engagement with the pin 12 as the shoulder 32 slides into contact with the pin 30.

Figure 2:
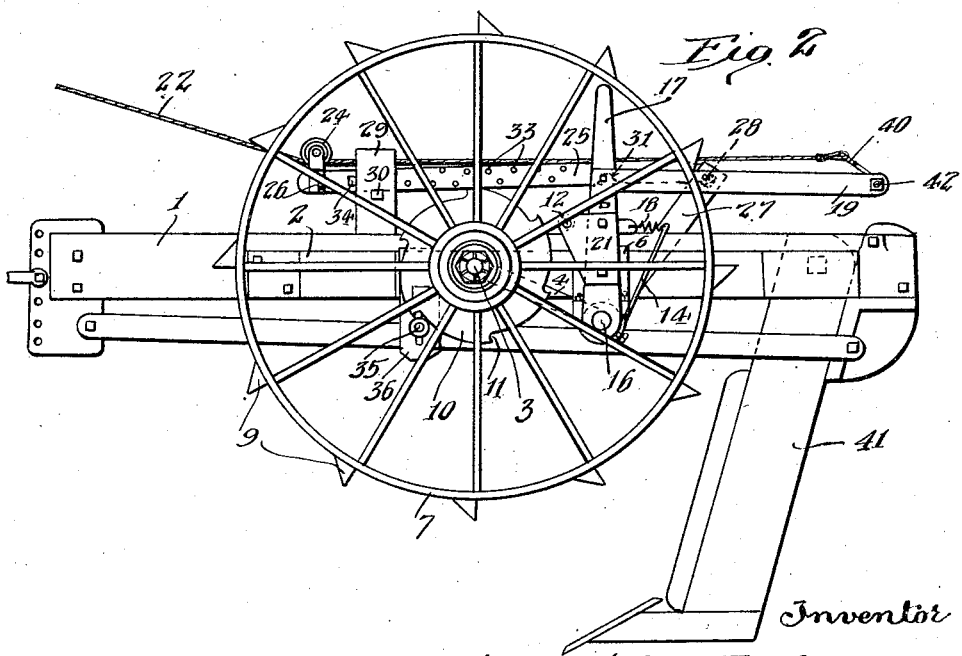
Figure 2 is a side elevation showing the plowshare in its lowest position.

To lower the plowshare into the ground from the position shown in Figure 2 the driver of the tractor 13 from the seat 23 thereof pulls and holds onto the cord 22 which pulls on the actuating rod or lever 19 which causes the pin 12 to engage a tooth 11 of the power wheel 10 whereby the arm 25 is raised removing the shoulder 32 from abutment with the pin 30 releasing the cord quickly, the plowshare drops into the position shown in Figure 2, when the arm 17 "cams" on the pin 35, thereby releasing the shoulder 11 from engagement with the pin 12. By this novel and simple arrangement of the parts the driver of the tractor is able to either lower or raise the plowshare from the ground without leaving the seat of the tractor or stopping the forward draft thereof which enables him to pass any obstruction which may be met.

Having fully specified a preferred embodiment of this invention and only one of the forms it may take; it is to be understood that I do not wish to be limited thereby in the practice of my invention nor in my claims to the particular preferred embodiment set forth therein.

I claim:

1. In an implement of the class described, the combination of a frame, a crank axle journaled in bearings transversely of the frame, a ground working tool supported by the frame, ground wheels journaled on the axle, means for rigidly connecting the ground wheels to the axle so that on rotation of the ground wheels the frame is elevated, means for releasing said connecting means after a predetermined rotation of the crank axle, means for holding the frame in the elevated position, a pulley mounted on one element of the said holding means, a flexible connecting member passing through the said pulley and connected with the said crank axle connecting means at a point above the said pulley for actuating the said connecting means to connect a ground wheel with the crank axle to rotate the said crank axle on rotation of the said ground wheel to release the said holding means.

2. In an implement of the class described, the combination of a frame, a crank axle journaled in bearings transversely on the frame, a ground working tool supported by the frame, ground wheels journaled on the axle, a slide bar, means for pivotally connecting the slide bar to an arm secured to the axle between the ends of the said axle, a standard mounted on the frame, a shoulder carried by the standard, a recess formed in the said slide bar in position to engage the shoulder to hold the frame elevated, means for rigidly connecting the ground wheels to the crank axle so that on rotation of the ground wheels the frame is elevated, a pulley mounted on the said slide bar and means connecting the forward end of the slide bar with the said ground wheel connecting means and passing through the said pulley and operable to actuate the said elevating means to elevate the slide bar to disengage the said shoulder from the recess to permit the frame to fall.

3. In an implement of the class described, the combination of a frame, a crank axle journaled in bearings transversely of the frame, a ground working tool supported by the frame, ground wheels journaled on the axle, a slide bar, an arm rigidly connected at one end to the axle and pivotally connected to the slide bar at its opposite end, a bifurcated standard mounted on the frame through which the slide bar slides, adjustable means for limiting the rearward slide of the slide bar, means for connecting a supporting wheel to the crank axle so that forward movement raises the implement, means secured to the standard and engageable with the slide bar for holding the crank axle in raised position, a pulley secured to the forward end of the slide bar, a flexible element connected to the ground wheel connecting means at a point above the pulley and passing through the said pulley and so that when the flexible element is pulled, the latter said arm is actuated to operate the crank axle rocking means to push the slide bar forward slightly so that the upward pull on the flexible element releases the slide bar holding means to permit the crank axle to rock to lower the frame.

4. In an implement of the class described, the combination of a frame, a crank axle journaled in bearings transversely of the frame, a ground working tool supported by the frame, ground wheels journaled on the axle, a slide bar, means for pivotally connecting the slide bar and an arm on the crank axle, a standard mounted on the frame, a ratchet wheel secured to one of the said ground wheels, means for connecting the crank axle with the ratchet wheel so that on rotation of the ground wheel the crank axle is rotated to elevate the frame, a latch for connecting the standard and the slide bar for holding the frame in the elevated position, a flexible element secured to said crank axle ratchet wheel connecting means and passing through a pulley mounted on the forward end of the slide bar for actuating the said crank axle connecting means to rock the crank axle to release the said latch, and means for releasing said connecting means at a predetermined rotation of the crank axle.

5. In an implement of the class described, the combination of a frame, a crank axle journaled in bearings transversely of the frame, ground wheels journaled on the axle, a ground working tool supported by the frame, means for connecting a ground working wheel with the crank axle so that on rotation of the said wheel the crank axle is rocked to elevate the frame, a standard mounted on the frame, a slide bar pivotally connected with an arm on the said crank axle at one end, means connected with the said standard for engaging the slide bar when the said frame is elevated at a predetermined point on the said slide bar, a pulley mounted on the said slide bar in advance of the said predetermined point on the said bar, and a flexible member passing through the said pulley and connected with the said means for connecting a ground wheel with the crank axle at a point above the said pulley.

Signed at Los Angeles, California, this 14th day of November, 1923.

HEBER F. TOWNER.